(12) United States Patent
Kakie

(10) Patent No.: US 8,689,332 B2
(45) Date of Patent: Apr. 1, 2014

(54) INFORMATION PROCESSING APPARATUS COOPERATING WITH VIRUS MANAGEMENT FUNCTION DEVICE, AND ANTI-VIRUS METHOD

(75) Inventor: Michito Kakie, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 325 days.

(21) Appl. No.: 12/890,201

(22) Filed: Sep. 24, 2010

(65) Prior Publication Data

US 2011/0016529 A1     Jan. 20, 2011

Related U.S. Application Data

(63) Continuation of application No. PCT/JP2008/055745, filed on Mar. 26, 2008.

(51) Int. Cl.
     *H04L 29/06*      (2006.01)
(52) U.S. Cl.
     USPC .............. 726/24; 726/22; 726/23; 726/25; 713/153; 713/154; 713/160
(58) Field of Classification Search
     USPC .............. 726/22–25; 713/153, 154, 160, 188, 713/190, 194
See application file for complete search history.

(56) References Cited

U.S. PATENT DOCUMENTS

| | | | |
|---|---|---|---|
| 7,010,696 | B1 | 3/2006 | Cambridge et al. |
| 2003/0200460 | A1 | 10/2003 | Morota et al. |
| 2006/0161987 | A1* | 7/2006 | Levy-Yurista ............ 726/24 |
| 2007/0044152 | A1* | 2/2007 | Newman et al. .......... 726/24 |
| 2008/0163372 | A1* | 7/2008 | Wang ........................ 726/24 |

FOREIGN PATENT DOCUMENTS

| | | |
|---|---|---|
| CN | 1444147 | 9/2003 |
| EP | 1 343 288 A1 | 9/2003 |
| JP | 2003-323312 | 11/2003 |
| JP | 2004-164270 | 6/2004 |
| JP | 2005-258514 | 9/2005 |
| JP | 2005-260612 | 9/2005 |
| JP | 2007-102697 | 4/2007 |
| WO | 2006/035928 A1 | 4/2006 |

OTHER PUBLICATIONS

Intel, "Intel® Active Management Technology System Defense and Agent Presence Overview", Version 3.0.4, Feb. 2007, pp. 1-26.
"AMT Live Update Antivirus", Ip.com Prior Art Database, Jan. 7, 2007, 1 p.

(Continued)

*Primary Examiner* — Brandon Hoffman
*Assistant Examiner* — Thong Truong
(74) *Attorney, Agent, or Firm* — Staas & Halsey LLP

(57) ABSTRACT

An information processing apparatus provided with a first information processing unit and a second information processing unit, wherein the first information processing unit infected by a virus is cleared and normal communication restored quickly without human operation. The virus infection is quickly detected by an external virus management function device through a first communication system, a communication suspension instruction is transferred through a different second communication system having a high security level to the first information processing unit, and communication by the first communication system is disconnected. Further, anti-virus solution information is transferred to the first processing unit through the second communication system, and virus removal in the first processing unit is carried out. Further, after removal, the disconnected communication is restarted.

20 Claims, 14 Drawing Sheets

(56) References Cited

OTHER PUBLICATIONS

Patrick Schmid, "Remote PC Management with Intel's vPro", Tom's Hard-ware, Apr. 26, 2007 (retrieved from the internet on Apr. 8, 2011), 3 pp.

European Search Report dated Apr. 29, 2011 in corresponding European Patent Application 08738933.4.
Chinese Office Action issued Oct. 26, 2012 in corresponding Chinese Patent Application No. 200880128240.2.
International Search Report for PCT/JP2008/055745; mailed Dec. 2, 2008.

* cited by examiner

FIG.2
(A)
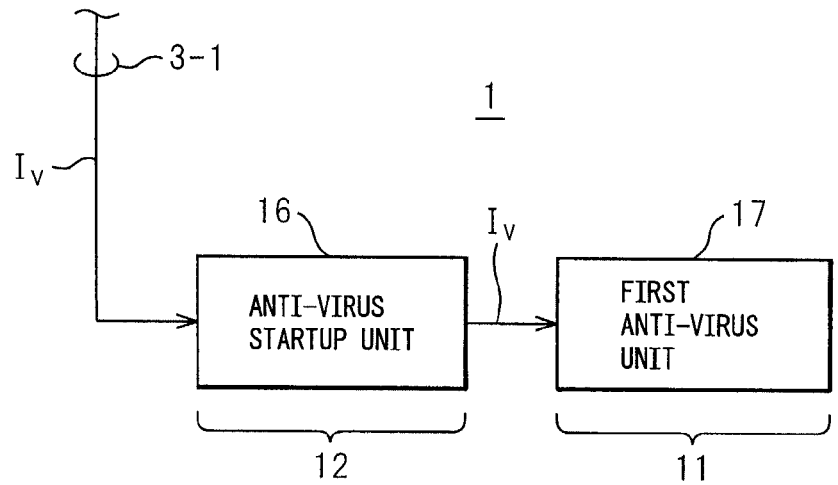
(B)
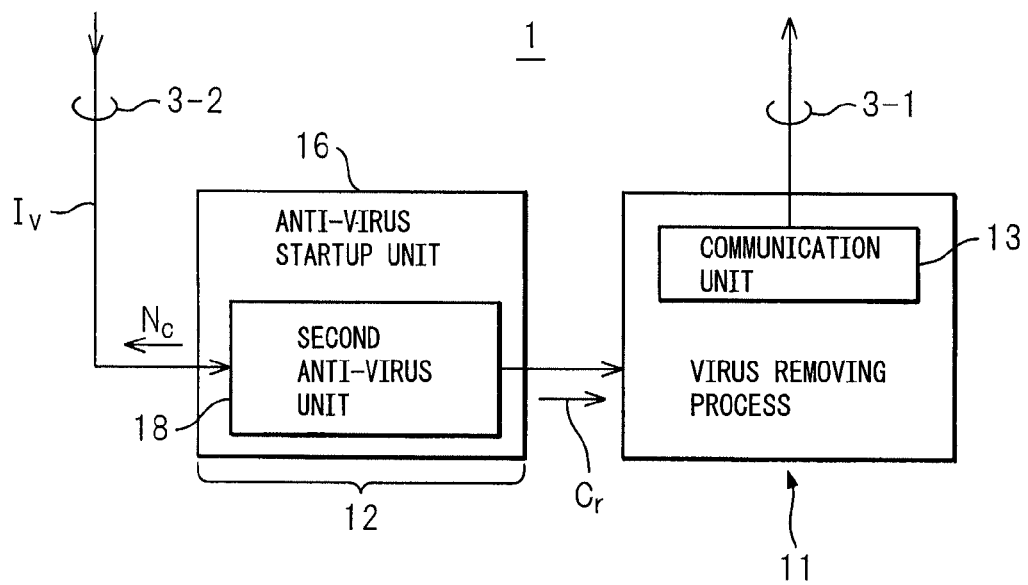

FIG.3
(A)
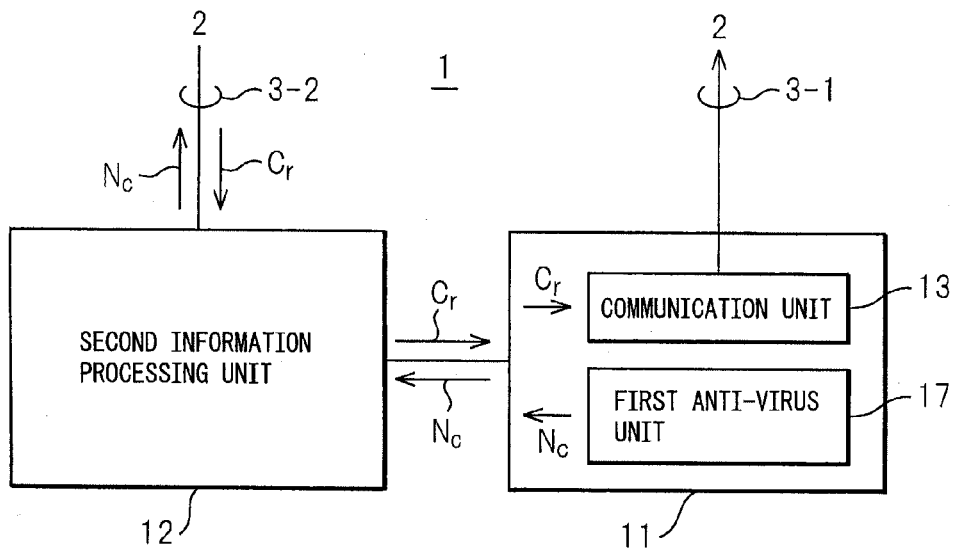
(B)
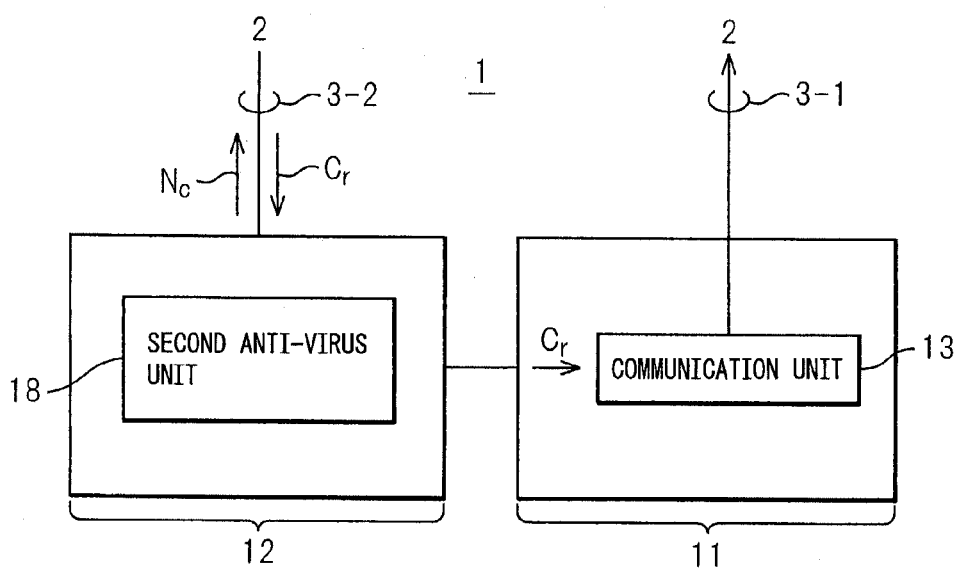

INFORMATION PROCESSING APPARATUS COOPERATING WITH VIRUS MANAGEMENT FUNCTION DEVICE, AND ANTI-VIRUS METHOD

CROSS-REFERENCE TO RELATED APPLICATION

This application is a continuation application based on International Application No. PCT/JP2008/055745, filed on Mar. 26, 2008, the contents being incorporated herein by reference.

FIELD

The embodiments discussed herein are related to an information processing apparatus, particularly an information processing apparatus provided with an anti-virus function, and further relates to a virus management function device cooperating with that anti-virus function. Further, it relates to an anti-virus method and program.

BACKGROUND

As is well known, portable devices such as for example mobile phones and other such information processing apparatuses are rapidly and broadly spreading in use. Further, their functions are becoming increasingly sophisticated. Under view of such a situation, further secure anti-virus systems are being demanded.

Note that, as known art related to the present invention, a quarantine system of the following Patent Document 1, a worm monitoring and solution system of the following Patent Document 2, a virus infection alert system of the following Patent Document 3, etc. are known.

Patent Document 1: Japanese Laid-Open Patent Publication No. 2007-102697
Patent Document 2: Japanese Laid-Open Patent Publication No. 2005-260612
Patent Document 3: Japanese Laid-Open Patent Publication No. 2004-164270

DISCLOSURE OF INVENTION

Technical Problem

For example, an information processing apparatus, e.g., a personal computer (PC), connected to the Internet is easily infected by viruses. Such infections spread to many other PCs in a short time as is well known.

When a PC is infected by a virus in this way, the PC begins to behave strangely immediately or after a certain time passes. The user begins to recognize the fact of infection by a virus first when sensing such strange behavior of the PC.

Under those circumstances, the user manually disconnects communication with the external network by for example the method of pulling out the communication cable connected to the PC or another such method so as to prevent the spread of the virus to the outside.

After that, further, in order to remove that virus, the user installs an anti-virus tool in the PC, or updates the virus definition file to the newest one if the anti-virus tool is originally installed in the PC, to thereby remove the virus.

However, the above anti-virus method has at least the following two issues.

[Issue 1]
Time passes from when the PC is infected by a virus to when the user notices the infection, so the damage by the virus infection is liable to further spread during that interval.

[Issue 2]
Much manual work is required from when the user recognizes the above virus infection to when the user removes that virus, so this is very troublesome for the user.

SUMMARY

Accordingly, in consideration with the problems described above, it is an object of the embodiments to provide an anti-virus system capable of extremely quickly detecting virus infection and blocking the spread of the infection and, thereafter, capable of automatically removing the virus and restoring communication after the removal without operation by the user, particularly an anti-virus system suitable for the above information processing apparatus which includes the above portable devices as examples.

To achieve the above object, one aspect of an information processing apparatus is configured by a first information processing unit and a second information processing unit and cooperates with an external virus management function device.

BRIEF DESCRIPTION OF DRAWINGS

FIGS. 2 include a view illustrating a first aspect (FIG. 2A) and a second aspect (FIG. 2B) of an anti-virus startup unit 16 in FIG. 1.

FIGS. 3 include views illustrating a first aspect (FIG. 3A) of reconnection of communication when a first anti-virus unit 17 is employed and a second aspect (FIG. 3B) of reconnection of communication when a second anti-virus unit 18 is employed in FIG. 1.

DESCRIPTION OF EMBODIMENTS

As mentioned before, an information processing apparatus is configured by a first information processing unit and a second information processing unit and cooperates with an external virus management function unit. The first information processing unit is, for example, a PC unit and the second information processing unit is, for example, a mobile phone unit.

When the virus management function device detects a virus infection in information communicated by a first information processing unit during communication through a first communication system, this virus infection is reported to a communication suspension instruction unit in a second information processing unit through a different second communication system independent from the first communication system to suspend the processing of the first information processing unit. After this, through the second communication system, the virus management function device removes the virus in the first information processing unit by using anti-virus solution information received at an anti-virus startup unit in the second information processing unit. Further, at the time of completion of the virus removal, the communication suspension command is cancelled, and the original communication is reconnected with.

On the other hand, the virus management function device detects the virus infection, sends instructions for suspending communication of the first information processing unit through the second communication system at the time of detection, and further sends the anti-virus solution information to the second information processing unit through the second communication system to thereby remove the virus in the first information processing unit.

Advantageous Effects

The anti-virus system including the virus management function device and at least one information processing apparatus cooperating with this quickly detect a virus infection in the information processing apparatus and disconnect the communication for preventing the spread of the virus infection to the outside by cooperation of both the virus management function device and the information processing apparatus so as to deal with the Issue 1.

In this case, by the above cooperation with the above virus management function device, the processing from the removal of the virus to the restart of the communication, after the disconnection of the communication and the removal of the virus, is all automatically executed without operation by the user. Due to this, the above Issue 2 is dealt with as well.

Figure 1:
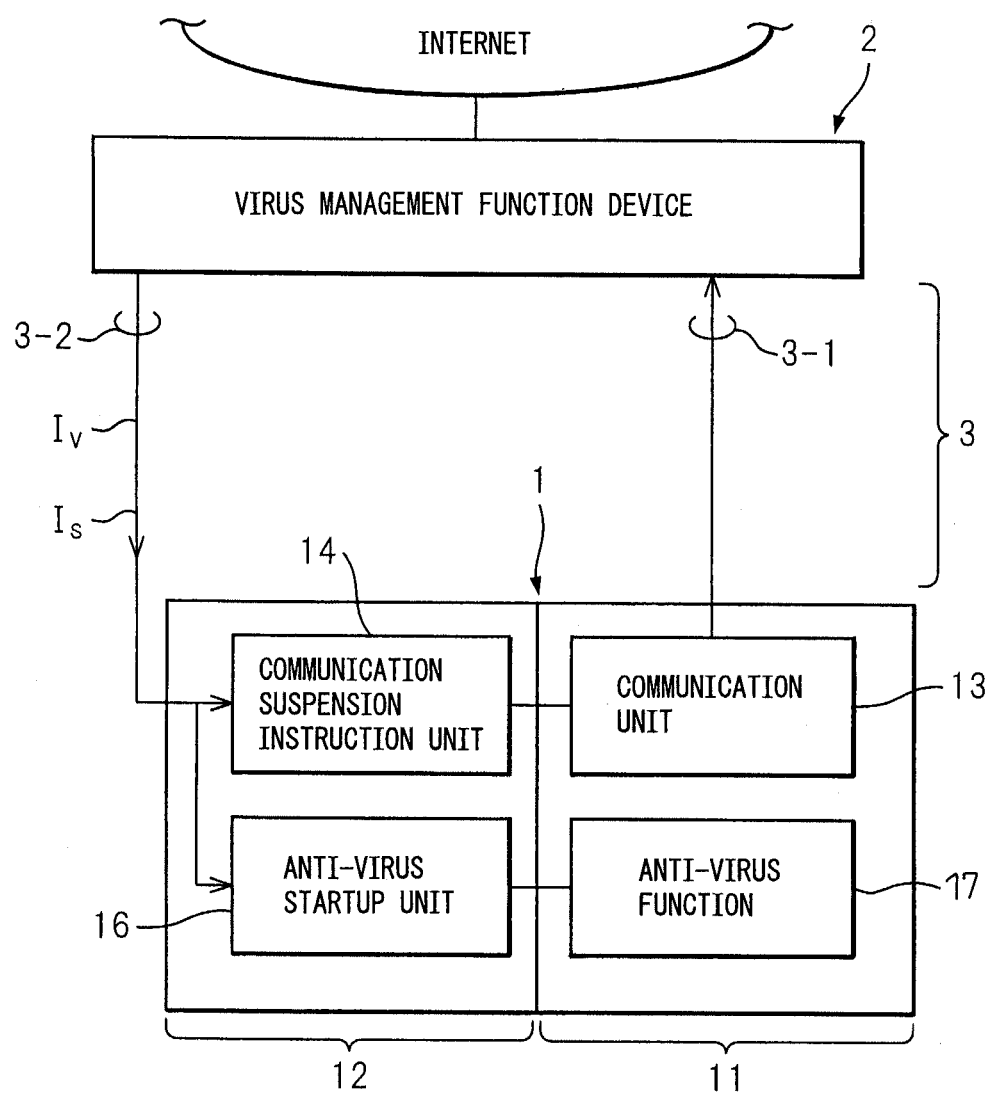
FIG. 1 is a view illustrating an embodiment of an anti-virus system disclosed by the Present Description.

FIG. 1 is a view illustrating an embodiment of an anti-virus system disclosed by the Present Description. First, when looking at an information processing apparatus 1, the information processing apparatus 1 has a first information processing unit 11 and a second information processing unit 12 which are both connected to an external virus management function device 2 through a communication network 3.

The second information processing unit 12 has a communication suspension instruction unit 14 which receives, through a second communication system 3-2 having a high security level and independent from a first communication system 3-1 of a communication network 3, a communication suspension instruction Is transmitted through the second communication system 3-2 when the virus management function device 2 detects the virus infection from the information during communication by a first information processing unit 11 through a communication unit 13 thereof, and stops the communication unit 13, and, further, is provided with an anti-virus startup unit 16 removing the virus in the first information processing unit 11 by anti-virus solution information Iv received from the virus management function device 2 through the second communication system 3-2.

The anti-virus startup unit 16 in the second information processing unit 12 may transfer the received anti-virus solution information Iv to a first anti-virus unit 17 in the first information processing unit 11 to remove the virus in the first information processing unit 11 as illustrated in FIG. 2(A) or the anti-virus startup unit 16 in the second information processing unit 12 may be configured by a second anti-virus unit 18 removing, by itself, the virus in the first information processing unit 11 by using the received anti-virus solution information Iv as illustrated in FIG. 2(B).

When the first information processing unit 11 has the first anti-virus unit 17 in it (see FIG. 2(A)), as illustrated in FIG. 3(A), the first information processing unit 11 cancel, by itself, the above communication suspension command for the communication unit 13 of the unit 11 based on a communication reconnection instruction Cr which is returned as a response to the transmission of a completion notification Nc to the virus management function device 2, which Nc indicates the completion of the removal of the virus, using the anti-virus solution information Iv, by the first anti-virus unit 17.

On the other hand, when the second information processing unit 12 has the second anti-virus unit 18 in it (see FIG. 2(B)), as illustrated in FIG. 3B, the second information processing unit 12 cancels the communication suspension command at the communication unit 13 in the first information processing unit 11 based on the reconnection instruction Cr which is returned as a response to the transmission of the completion notification Nc to the virus management function device 2, which Nc indicates the completion of the removal of the virus, using the anti-virus solution information Iv, by the second anti-virus unit 18.

Note that, as preferred examples,
the first information processing unit 11 is a PC unit, and the second information processing unit 12 is a mobile phone unit,
the communication network 3 configured by the first communication system 3-1 is an IP communication network, and the communication network 3 configured by the second communication system 3-2 is a circuit switching network, and
the anti-virus solution information Iv contains an anti-virus tool and a virus definition file.

Figure 4:
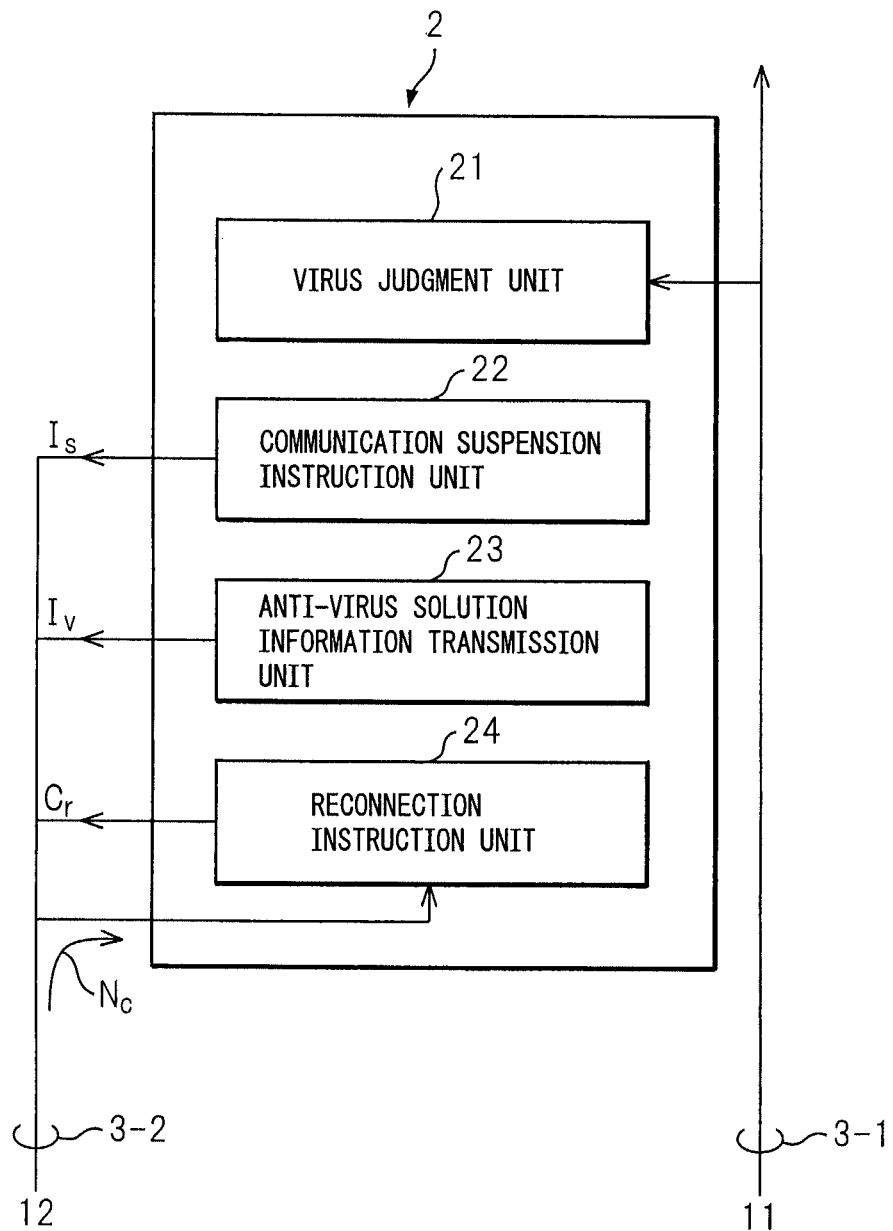
FIG. 4 is a view illustrating the configuration of a virus management function device in FIG. 1.

Next, when viewing the virus management function device 2 with reference to FIG. 4, the device 2 is
a virus management function device connected, via the communication network 3, to the above information processing apparatus 1 having the first information processing unit 11 and second information processing unit 12 and is configured by:
a virus judgment unit 21 detecting virus infection from information communicated by the first information processing unit 11 through the first communication system 3-1 of communication network 3,
a communication suspension instruction unit 22 transmitting, when detecting the virus infection, the communication suspension instruction Is for suspending the communication to the second information processing unit 12 through the second communication system 3-2 which is independent from the first communication system 3-1 and has a high security level, and
a removal solution information transmission unit 23 subsequently transmitting, to the second information processing unit 12, the anti-virus solution information Iv for removing the virus in the information processing apparatus 1 through the second communication system 3-2.

The device 2 further has a reconnection instruction unit 24. The instruction unit 24 achieves a function of returning back the communication reconnection instruction Cr for canceling the communication suspension instruction Is to the second information processing unit 12 through the second communication system 3-2 in response to the transmission of the completion notification Nc from the second information processing unit 12 through the second communication system 3-2 of the communication network 3, due to the completion of the removal of the virus in the information processing apparatus 1 by using the anti-virus solution information Iv.

Figure 5:
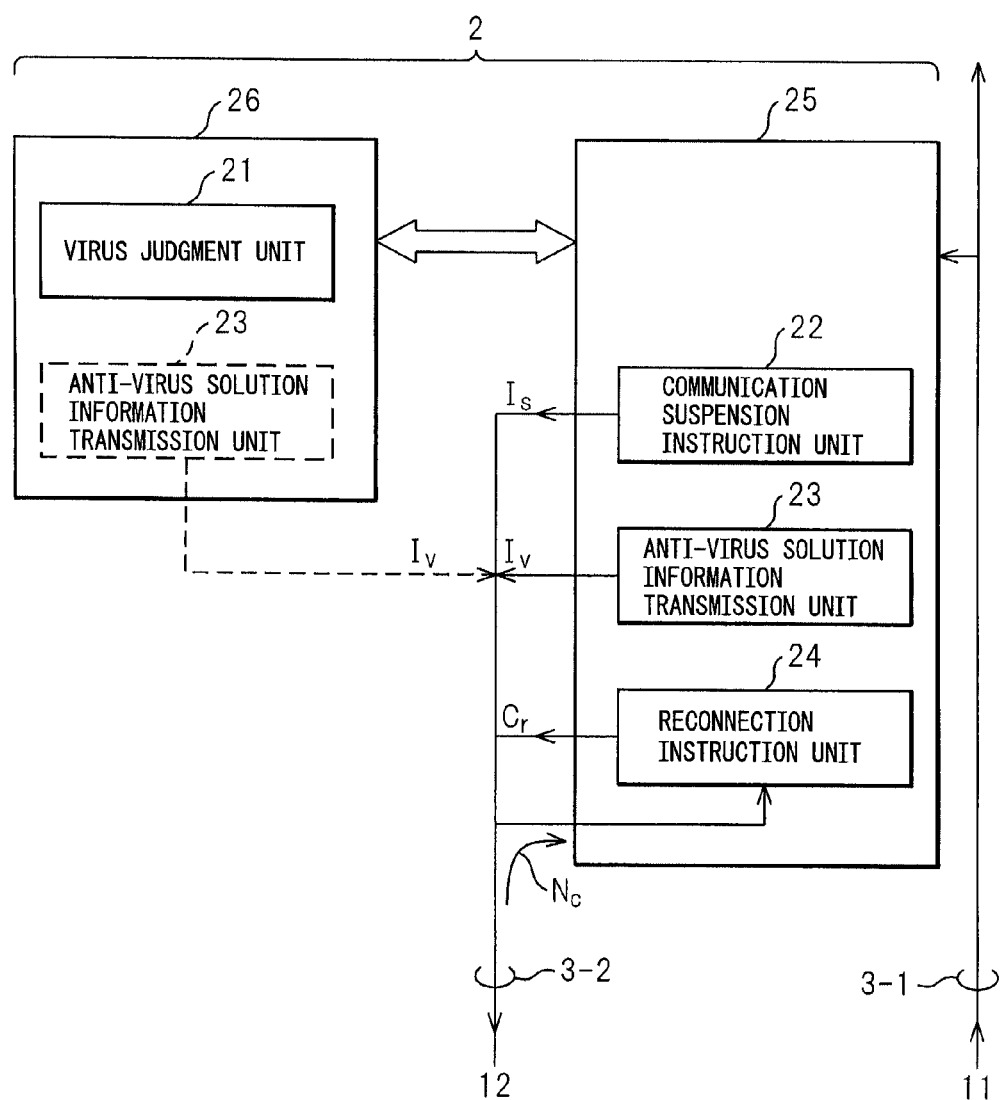
FIG. 5 is a view illustrating another configuration of the virus management function device in FIG. 1.

Note that, the virus management function device 2 may be configured to have integrally built-in virus judgment unit 21, communication suspension instruction unit 22, removal solution information transmission unit 23, and reconnection instruction unit 24 as illustrated in FIG. 4, or the virus management function device 2 may be configured, as illustrated in FIG. 5, by a first virus management function unit 25 provided with the virus judgment unit 21, communication suspension instruction unit 22, and reconnection instruction unit 24 and by a second virus management function unit 26 independent from the first virus management function unit 25. The second virus management function unit 26 may detect a virus infection by the virus judgment unit 21 and send the anti-virus solution information Iv to the second information processing unit 12 through the first virus management function unit 25 or directly.

When explaining the above anti-virus system for further easy understanding, there is a portable device 1 having a first information processing unit 11 (hereinafter, referred to as the PC unit 11) and a second information processing unit 12 (hereinafter, referred to as the mobile phone unit 12). In an environment where a virus management function device 2 capable of judging virus infection is connected to that portable device 1 through a communication line (communication network 3), when the PC unit 11 of the portable device 1 is infected by a virus, the virus management function device 2 detects the fact of the infection and disconnects the IP communication by the PC unit 11 of the portable device 1. The virus detection and disconnection of IP communication are smoothly carried out by the virus management function device 2. Accordingly, the time taken from the virus infection to the action of the anti-virus is much shorter compared with the conventional case.

Further, by instructing the virus management function device 2 itself or instructing a dedicated terminal (see 26 of FIG. 5), the device 2 transmits a "tool for removing the virus infected" or a "virus definition file" to the mobile phone unit 12 of the portable device 1 by using a communication network (corresponding to 3-2) different and independent form the IP communication network (corresponding to 3-1), and the mobile phone unit 12 of the portable device 1 receives those tool and file.

The mobile phone unit 12 of the portable device 1 transfers the anti-virus tool or virus definition file to the PC unit 11, and the PC unit 11 installs the received anti-virus tool in itself or updates the virus definition file to remove the virus infected.

Further, as another removing method of virus, the mobile phone unit 12 receives the anti-virus tool or virus definition file from a server to remove the virus in the PC unit 11, as well.

When the removal of the virus is completed, the portable device 1 notifies the fact of completion to the virus management function device 2, then the device 2, receiving this notification, re-connects the IP communication of the portable device 1 which has been disconnected. By these methods, the removal of virus and the restart of IP communication can be automatically carried out, and the load of the user is minimized almost completely.

Figure 6:
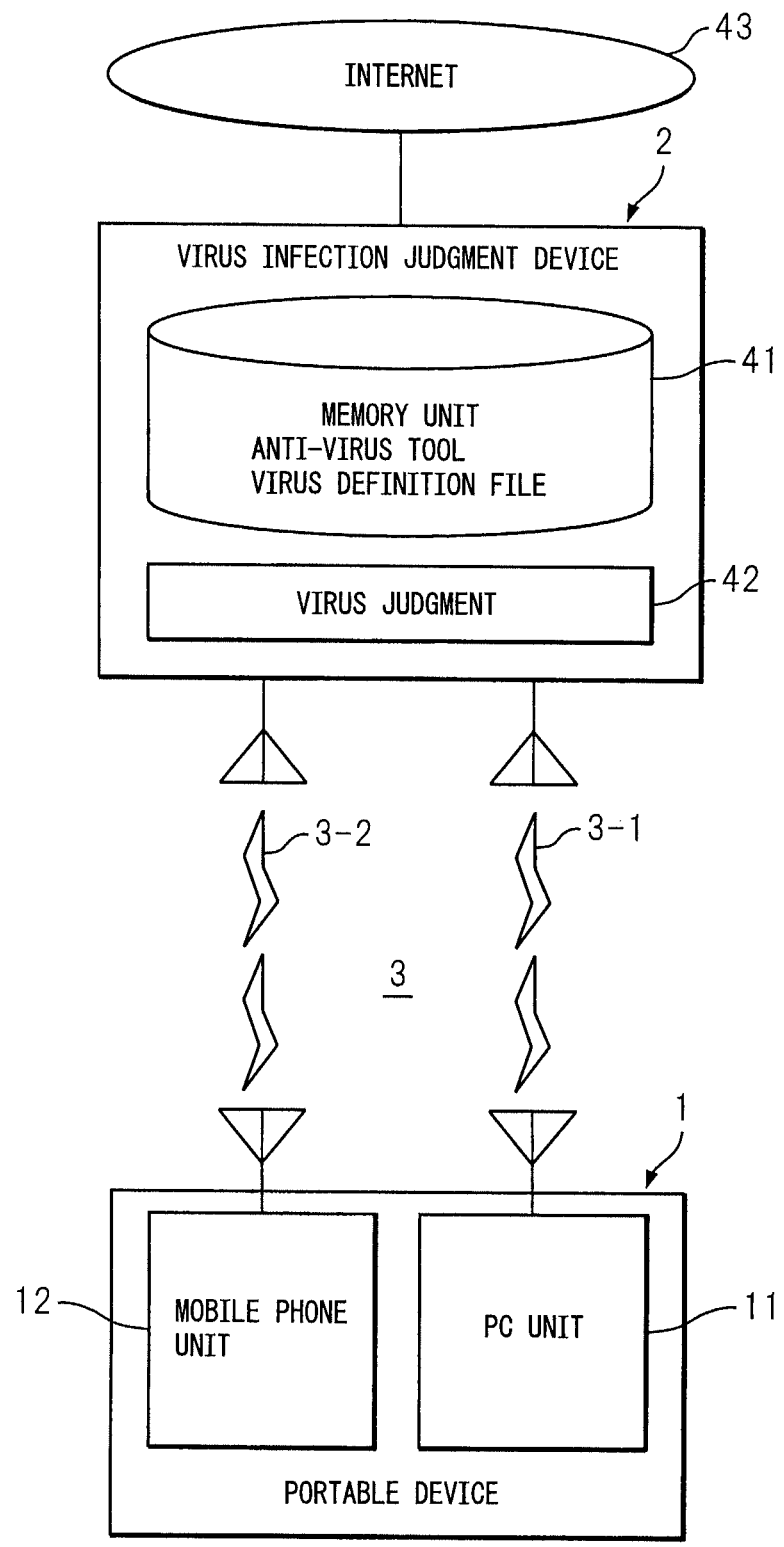
FIG. 6 is a view illustrating further concretely the anti-virus system in FIG. 1.

FIG. 6 is a view further concretely showing the anti-virus system of FIG. 1. In the figure, the portable device 1 has the PC unit 11 and mobile phone unit 12 in the illustrated form and is connected by wired line or wirelessly with the virus management function device 2.

The virus management function device 2 is provided with a memory unit 41 and a virus judging part 42 (same as 2 or 22 to 24 explained before) etc. and is connected by wired line or wirelessly to at least one portable device 1, on one hand, and the Internet 43, on the other hand.

The virus management function device 2 analyzes the information transmitted from the portable device 1 and judges whether the portable device 1 is infected by virus with the use of the virus judging part 42. When judging that the portable device 1 is infected by virus, the part 42 transmits the anti-virus tool or virus definition file stored in the memory unit 41 to the portable device 1, then the portable device 1 removes the virus based on the transmitted tool or file. Note that, the flow of the virus removal by the portable device 1 will be explained in detail later.

Figure 7:
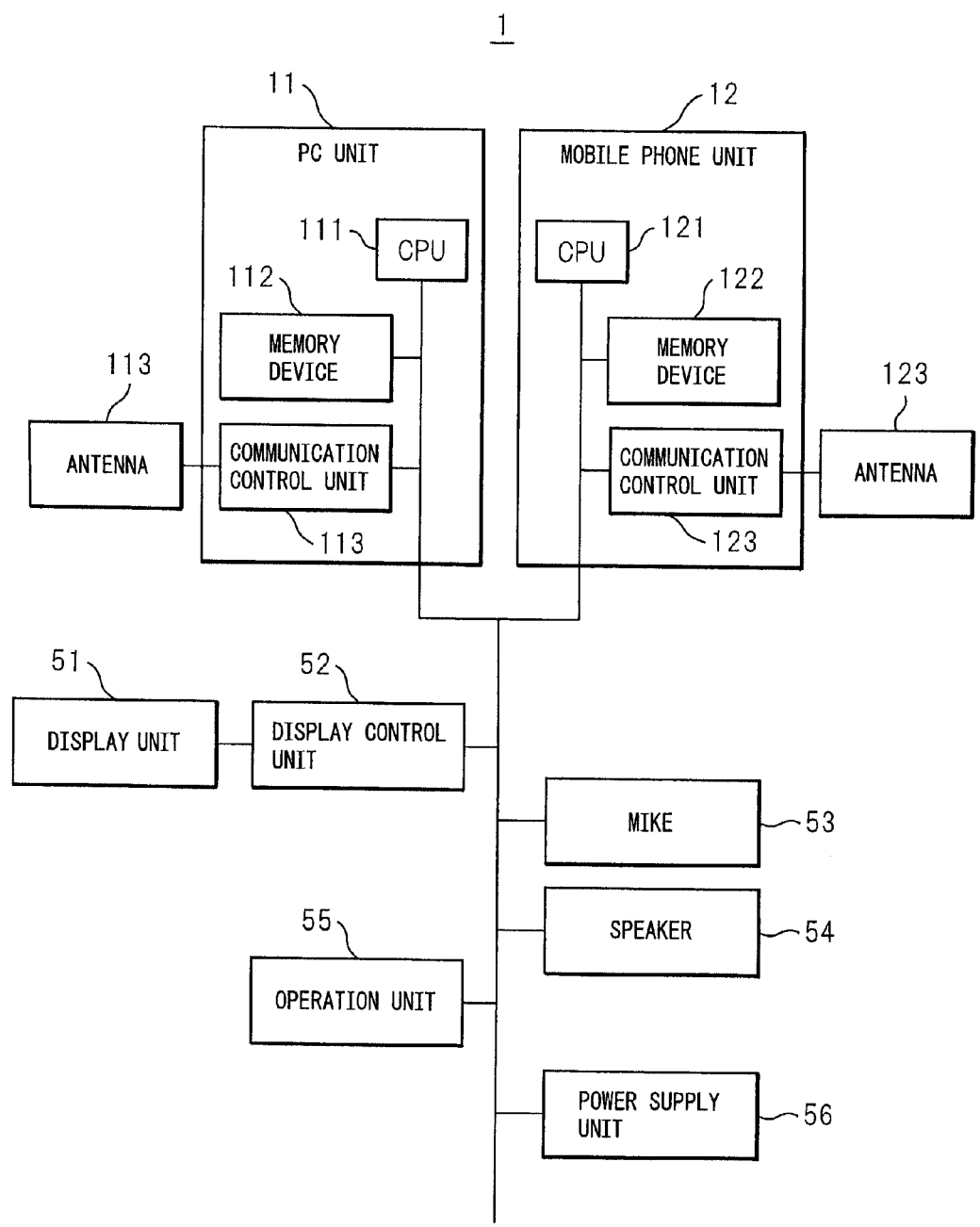
FIG. 7 is a block diagram illustrating an example of the hardware configuration of a portable device 1 in FIG. 6.

FIG. 7 is a block diagram showing an example of the hardware configuration of the portable device 1 in FIG. 6. In the figure, the portable device 1 is provided with a PC unit 11 and a mobile phone unit 12. Each is provided with a CPU 111 or 121 and a memory device 112 or 122. The CPU 111 and CPU 121 perform control of the portable device 1, processing, etc. and store operating systems, application software, data, and so on.

Further, each of the PC unit 11 and mobile phone unit 12 has a communication control unit 113 (corresponding to the communication unit 13) or 123 and controls transfer of information through an antenna 113 or 123. Note that, the present portable device 1 is provided with a display control unit 52 displaying a screen on a display unit 51 and a mike 53 and a speaker 54 used for input/output of audio, as well other than the above mentioned members.

An operation unit 55 is a keyboard or mouse etc. A power supply unit 56 supplies power to the entire portable device 1.

Figure 8:
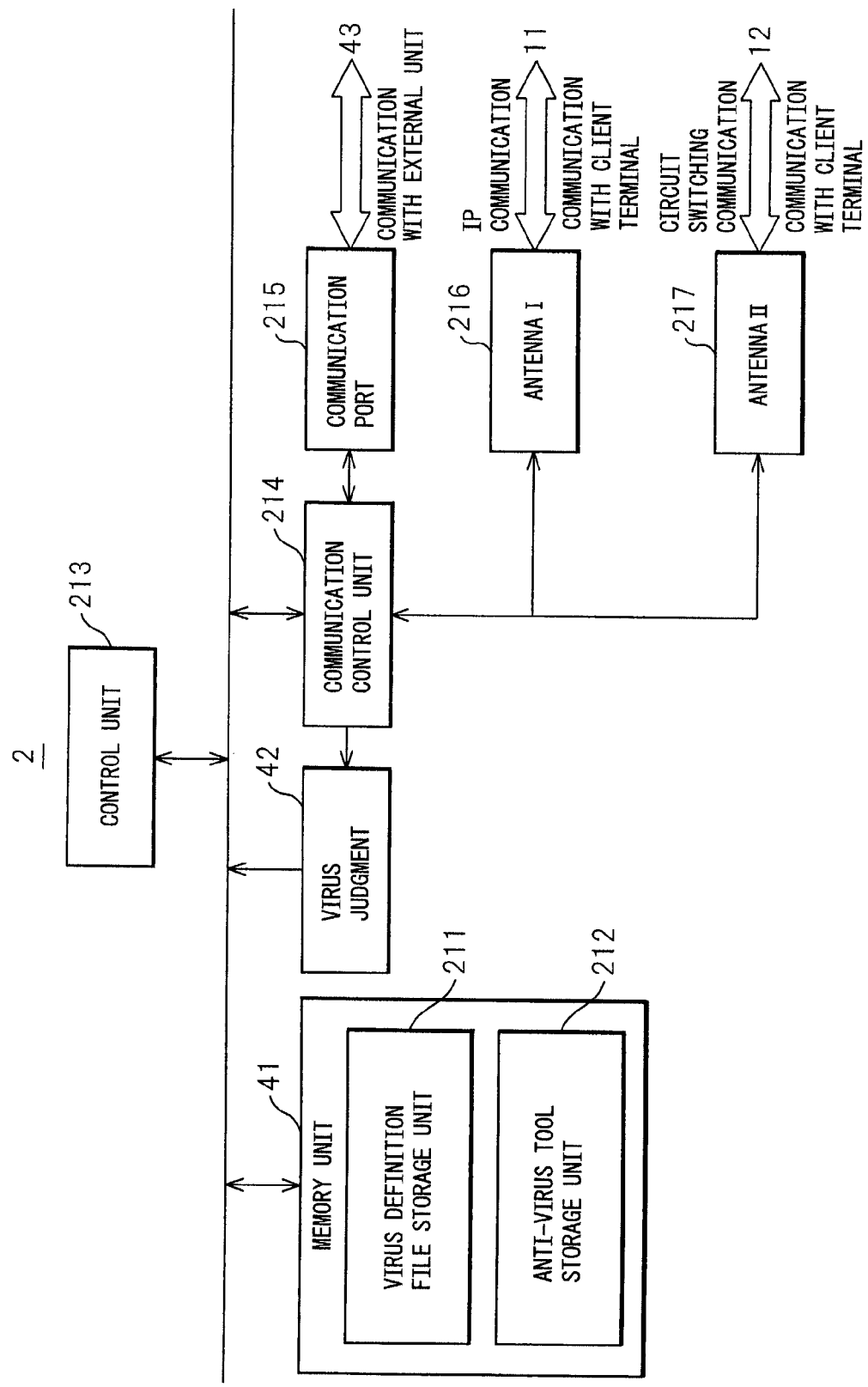
FIG. 8 is a block diagram illustrating an example of the hardware configuration of a virus management function device 2 in FIG. 6.

FIG. 8 is a block diagram showing an example of the hardware configuration of the management function device 2 in FIG. 6. In the figure, a control unit 213 of the virus management function device 2 controls the entire device 2, while the memory unit 41 has a built-in virus definition file storage unit 211 and anti-virus tool storage unit 212.

The virus judging part 42 analyzes the information sent from the portable device 1 through the antenna 216 and communication control unit 214 by IP communication (3-1) and judges whether the portable device 1 is infected by a virus.

Further, it is possible to transmit the anti-virus tool or virus definition file to the mobile phone 12 of the portable device 1 through the antenna 217. Further, the device 2 can communicate with the Internet 43 by using a communication port 215 as well.

Figure 9:
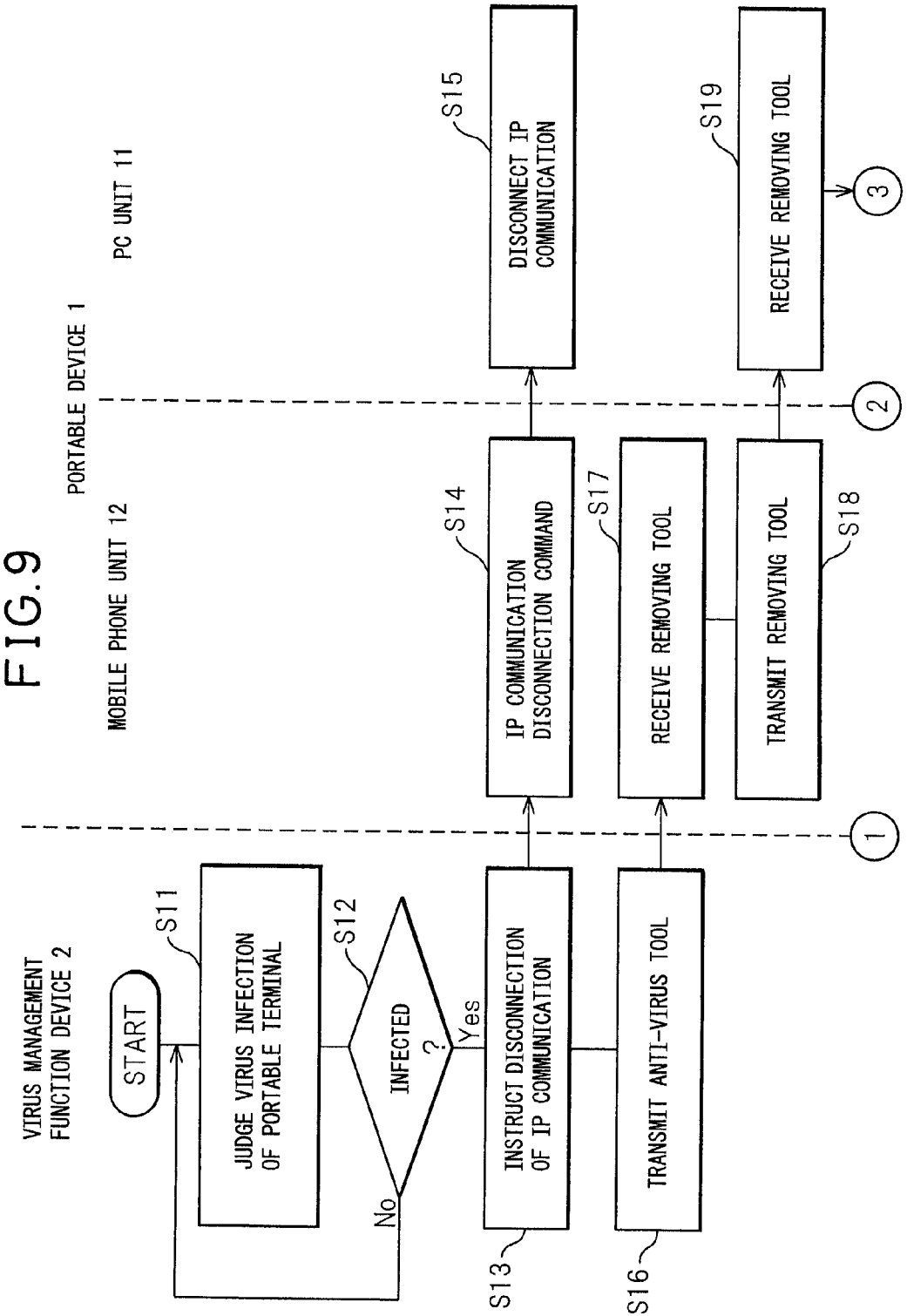
FIG. 9 is a flow chart (first part) depicting the situation of virus removal based on a first aspect of the portable device 1 in the anti-virus system of FIG. 6.
Figure 10:
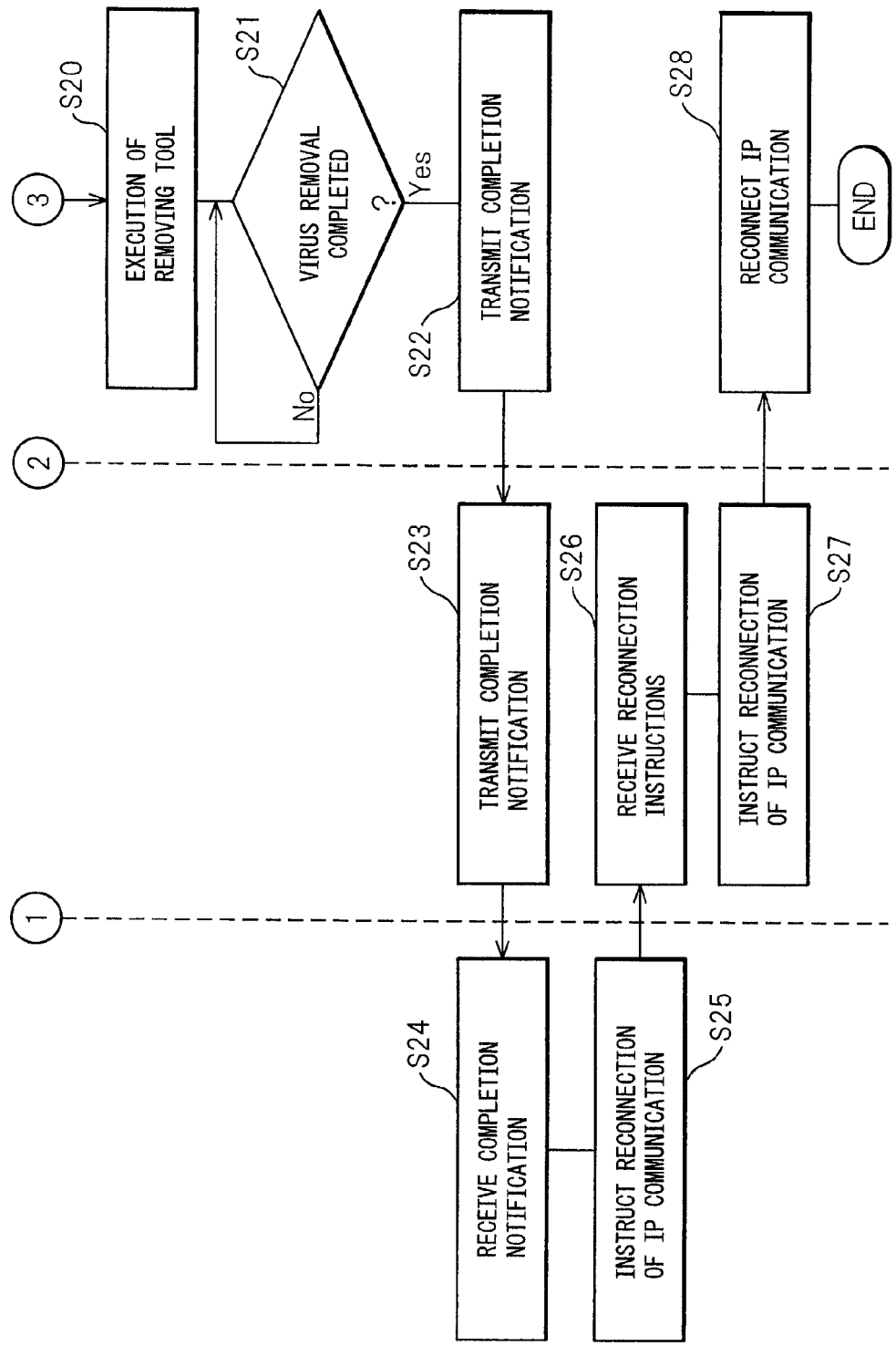
FIG. 10 is a flow chart (second part) depicting the situation of virus removal based on the first aspect in the portable device 1 in the anti-virus system of FIG. 6.

FIG. 9 is a flow chart depicting the situation of virus removal based on a first aspect of the portable device 1 in the anti-virus system of FIG. 6, while FIG. 10 is the same flow chart (part 2).

The virus management function device 2 analyzes the information sent from the PC unit 11 of the portable device 1 and judges the presence of any virus infection (step S11). Then, when judging that the portable device 1 is infected by a virus (Yes of step S12), it issues a disconnection instruction to the mobile phone unit 12 of the portable device 1 so as to disconnect the IP communication by the PC unit 11 (step S13).

The mobile phone unit 12 receives the disconnection instruction and issues a disconnection command of the IP communication to the PC unit 11 (step S14) and disconnects the IP communication by the PC unit 11 by, for example, a method of invalidating a driver forming the communication control unit 113 (step S15). Note that, the disconnection of IP communication may be achieved by an external unit of the portable device 1, for example, a switching hub, as well.

The virus management function device 2 transmits the anti-virus tool and virus definition file stored in the memory unit 41 to the mobile phone unit 12 of the portable device 1 through a communication network different and independent from the IP communication (3-1) (for example, the circuit switching network 3-2 having an extremely high security level compared with the IP communication network) after the disconnection instruction (S13) of the IP communication described above (step S16).

When receiving these tool or file (step S17), by the mobile phone unit 12, the unit 12 transfers those data to the PC unit 11 (step S18). The PC unit 11 receives those data from the mobile phone unit 12 (step S19) and removes the virus by using these anti-virus tool or virus definition file (step S20).

When the removal of the virus is completed (Yes of step S21), the PC unit 11 notifies the completion to the mobile phone unit 12 (step S22), then the mobile phone unit 12 receives this and notifies the completion of the virus removal to the virus management function device 2 (step S23).

The virus management function device 2 receives the notification (step S24) and transmits an instruction for reconnecting the IP communication which has been disconnected at the PC unit 11 to the mobile phone unit 12 of the portable device 1 (step S25). The mobile phone unit 12 instructs the reconnection of the IP communication to the PC unit 11 (step S27) when receiving the reconstruction instruction (step S26). According to this instruction, the PC unit 11 reconnects the IP communication.

Figure 11:
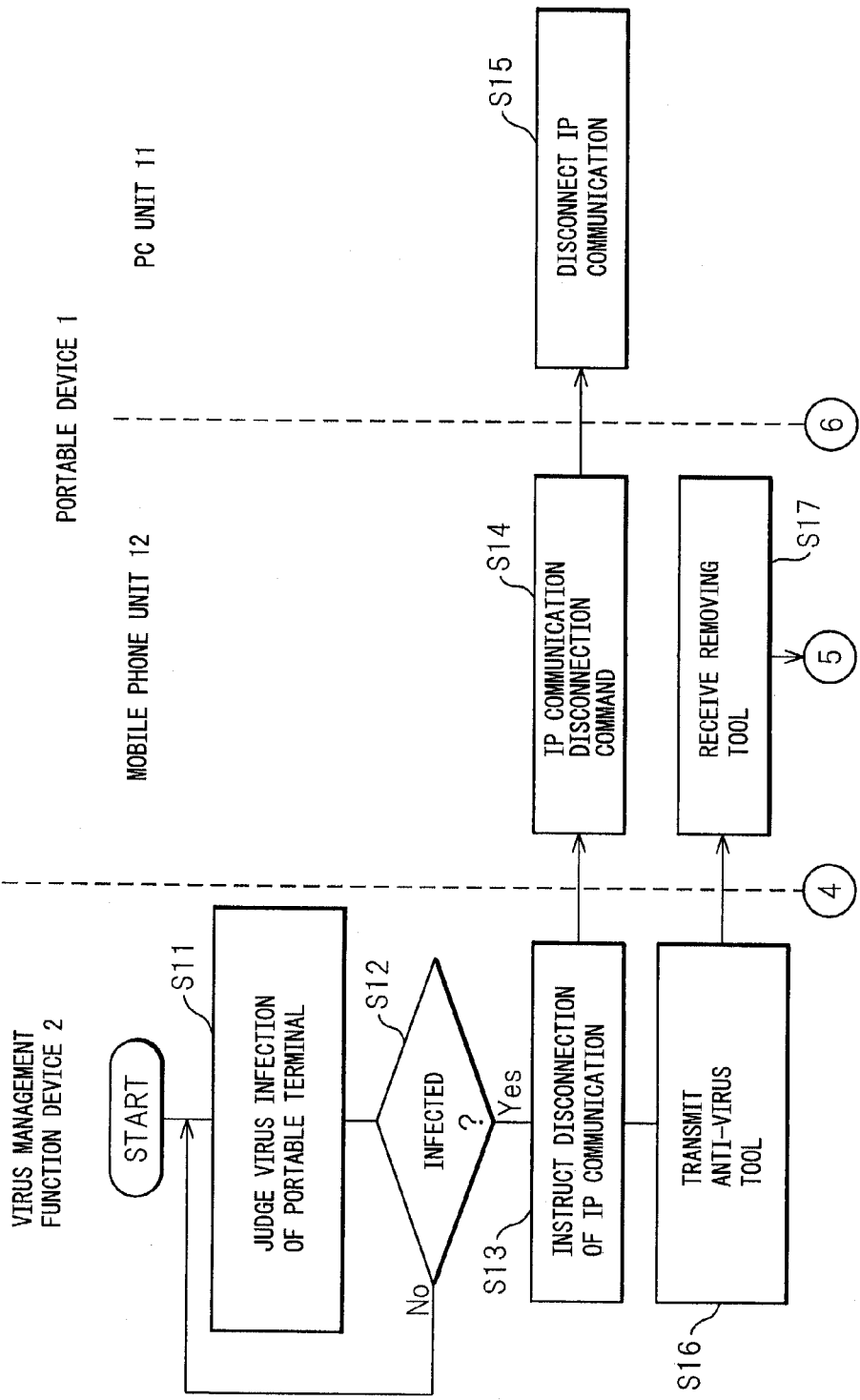
FIG. 11 is a flow chart (first part) depicting the situation of virus removal based on the second aspect in the portable device 1 in the anti-virus system of FIG. 6.
Figure 12:
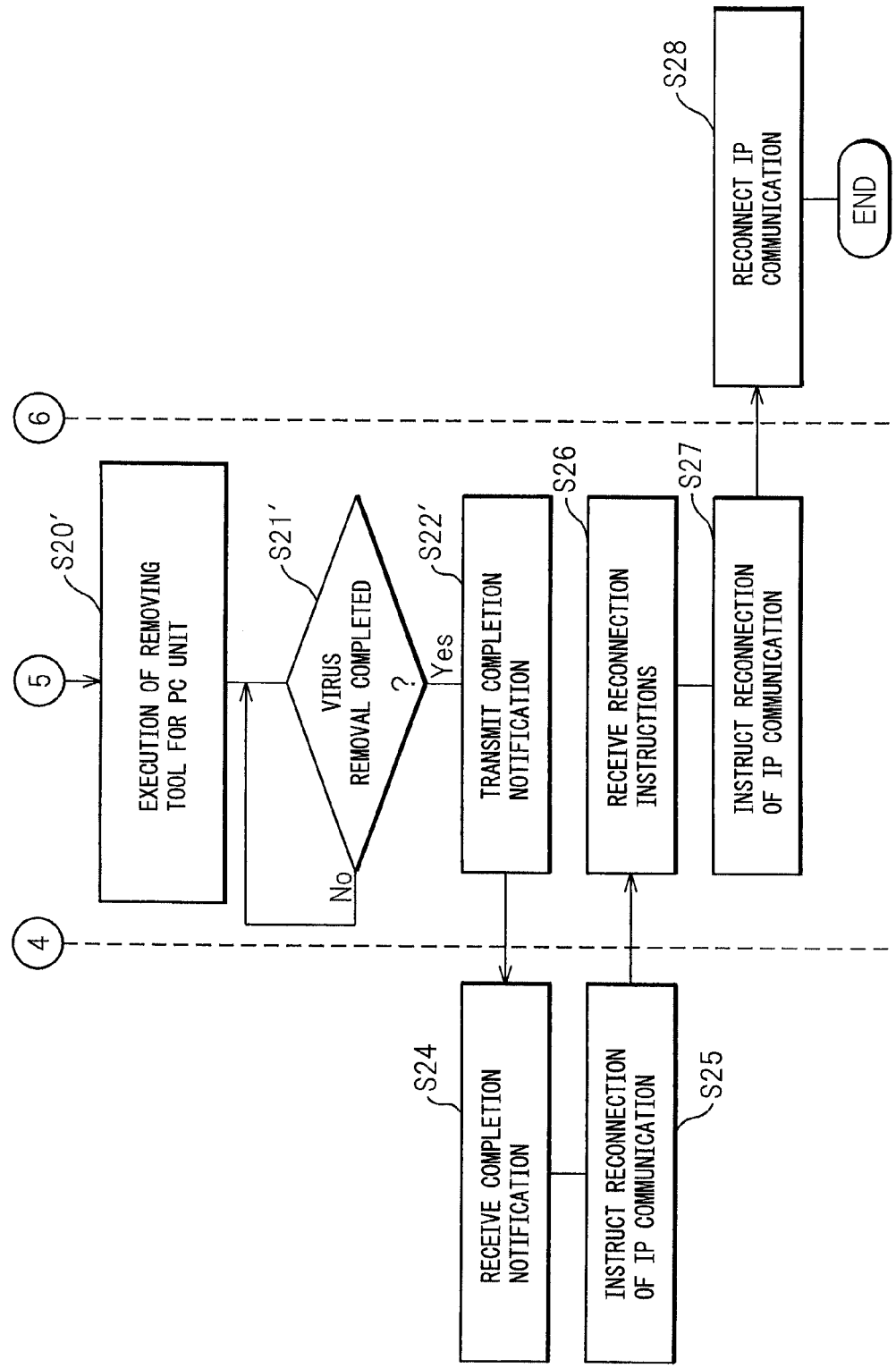
FIG. 12 is a flow chart (second part) depicting the situation of virus removal based on the second aspect in the portable device 1 in the anti-virus system of FIG. 6.

FIG. 11 is a flow chart depicting the situation of the virus removal based on the second aspect at the portable device 1 in the anti-virus system of FIG. 6 (part 1), while FIG. 12 is the same flow chart (part 2).

In the flow charts of FIG. 9 and FIG. 10 explained above, it was the PC unit 11 which removed the virus, but the virus is removed on the mobile phone unit 12 side here.

The flow of transmission of the anti-virus tool or virus definition file to the portable device 1 by the virus management function device 2 and reception of this at the mobile phone unit 12 (steps S11 to S17) is the same as the case of FIG. 9 described above.

In FIG. 11, when the mobile phone unit 12 of the portable device 1 receives the anti-virus tool or virus definition file (step S17), the mobile phone unit 12 removes the virus from the PC unit 11 by itself in FIG. 12 (step S20').

When the virus removal is completed (Yes of step S21'), the mobile phone unit 12 notifies the fact of completion to the virus management function device 2 (step S22').

After that, in the same way as that explained before, the virus management function device 2 issues the IP communication reconnection instruction to the portable device 1 (step S25) and reaches step S28 after passing through the already explained steps S26 to S27.

Note that, in FIG. 9 to FIG. 12, the processing from the completion of virus removal to the reconnection of the IP communication is carried out through the virus management function device 2. However, immediately after the completion of the virus removal, the PC unit 11 can perform reconnection of the disconnected IP connection by itself as well. Note, for feedback of the information to the virus management function device 2, desirably the completion of the virus removal is notified to the device 2 in any case.

Note that, here, an explanation was given of the portable device 1 which are integrally configured by both the PC unit 11 and the mobile phone unit 12, but effects the same as those described above can be exhibited in the anti-virus system which is configured by independent and separate PC device and mobile phone device as well.

Figure 13:
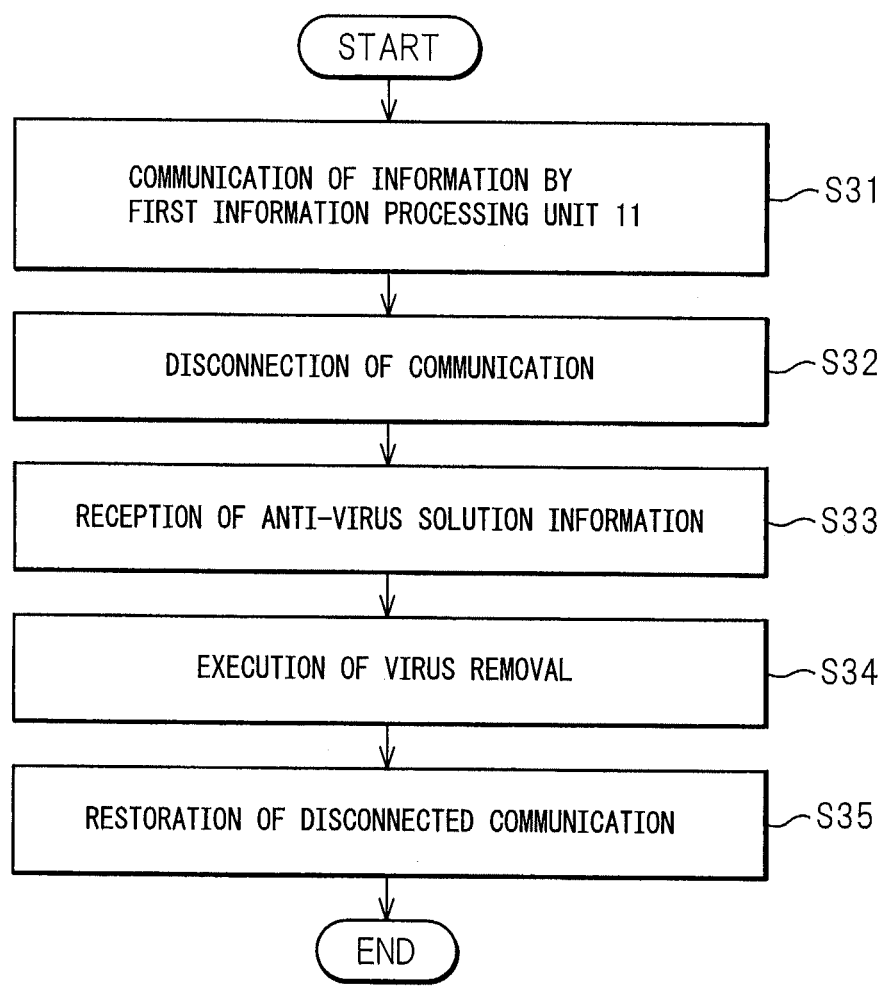
FIG. 13 is a flow chart representing flows expressed in FIG. 9 to FIG. 12 as the operation mainly performed by the portable device 1.
Figure 14:
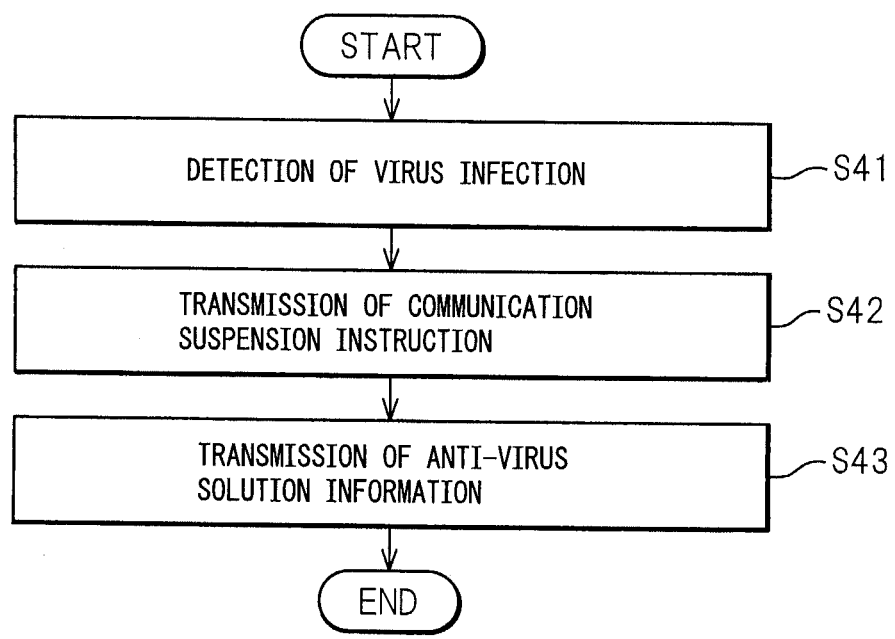
FIG. 14 is a flow chart representing flows expressed in FIG. 9 to FIG. 12 as the operation mainly performed by the virus management function device 2.

Summarizing the flow charts illustrated in FIG. 9 to FIG. 12 as steps of method, these steps may be represented by the flow charts of FIG. 13 and FIG. 14. Note, FIG. 13 relates to the portable device 1 of a concrete example, while FIG. 14 relates to the virus management function device 2 of the same.

Referring to FIG. 13 first, in the information processing apparatus 1 having the first information processing unit (PC unit) 11 and second information processing unit (mobile phone unit) 12 which are both connected through the communication network 3 to the external virus management function device 2, Step S31: The first information processing unit 11 communicates information through the first communication system 3-1 of the communication network 3 via the virus management function device 2.

Step S32: By detection of the virus infection from the above information by the virus management function device 2 at step S31 of the communication described above, the communication by the first information processing unit 11 is disconnected according to the communication suspension instruction Is received from the virus management function device 2 through the different second communication system 3-2 of the communication network 3 independent from the first communication system 3-1.

Step S33: Subsequently, the anti-virus solution information Iv is received from the virus management function device 2 through the second communication system 3-2 of the communication network 3.

Step S34: The virus in the first information processing unit 11 is removed based on the received anti-virus solution information Iv.

Step S35: When the virus removal is completed by step S34 of removal described above, the communication which has been disconnected is re-connected.

Note that, step S34 of removing the virus described above is executed by the second information processing unit 12 for the first information processing unit 11 based on the anti-virus solution information Iv, or executed by the first information processing unit 11 based on the anti-virus solution information Iv transferred from the second information processing unit 12.

Next, referring to FIG. 14, in the virus management function device 2 connected to the information processing apparatus 1 having the first information processing unit (PC unit) 11 and second information processing unit (mobile phone unit) 12 through the communication network 3, Step S41: The virus infection is detected from information during communication by the first information processing unit 11 through the first communication system 3-1 of the communication network 3.

Step S42: When detecting the virus infection, the communication suspension instruction Is suspending the above communication is transmitted to the second information processing unit 12 through the different communication system 3-2 of the communication network 3 independent from the first communication system 3-1.

Step S43: Following that, the anti-virus solution information Iv for removing the virus in the information processing apparatus 1 is transmitted through the second communication system 3-2 of the communication network 3 to the second information processing unit 12.

Note that, the method described above can be grasped as a computer program as well. Namely, in the information processing apparatus 1 having the first information processing unit 11 and second information processing unit 12 which are both connected through the communication network 3 to the external virus management function device 2, an anti-virus program making a computer execute:

a routine for having the first information processing unit 11 communicate information through the first communication system 3-1 of the communication network 3 through the virus management function device 2;

in that routine for communication, a routine for disconnecting the communication by the first information processing unit according to the communication suspension instruction Is received through the different second communication system of the communication network 3 3-2 independent from the first communication system 3-1 from the virus management function device 2, due to detection of the virus infection from the information described above by the virus management function device 2;

a routine for subsequently receiving the anti-virus solution information through the second communication system of the communication network from the virus management function device 2;

a routine for removing the virus in the first information processing unit based on the received anti-virus solution information; and a routine for reconnecting the above communication which has been disconnected when the virus removal is completed by the routine of removal explained before.

On the other hand, in the virus management function device 2 connected to the information processing apparatus 1 having the first information processing unit 11 and second information processing unit 12 through the communication network 3, an anti-virus program making a computer execute:

a routine for detecting the virus infection from the information during communication by the first information processing unit 11 through the first communication system 3-1 of the communication network 3;

a routine for transmitting the communication suspension instruction Is suspending the above communication to the second information processing unit 12 through the different second communication system 3-2 of the communication network 3 independent from the first communication system 3-1 when detecting the virus infection; and then a routine for transmitting anti-virus solution information Iv for removing the virus in the information processing apparatus 1 through the second communication system 3-2 of the communication network 3 to the second information processing unit 12.

What is claimed is:

1. An information processing apparatus comprising:
a first information processing unit which is connected, at a communication unit of the first information processing unit, through a first communication system of a communication network to an external virus management function device; and a second information processing unit which is coupled with the first information processing unit as one body in the information processing apparatus and connected, at both a communication suspension instruction unit and an anti-virus startup unit of the second information processing unit, through a second communication system of the communication network to the external virus management function device, the second communication system being different in type and independent from the first communication system, wherein the communication suspension instruction unit is configured to receive, through the second communication system of the communication network, communication suspension information transmitted when the external virus management function device detects virus infection from information during communication, through the communication unit of the first information processing unit, through the first communication system of the communication network and stop the communication unit, and the anti-virus startup unit is configured to remove the virus in the first information processing unit by anti-virus solution information subsequently received, after receiving the communication suspension information, from the external virus management function device through the second communication system of the communication network.

2. The information processing apparatus according to claim 1, wherein the anti-virus startup unit transfers the received anti-virus solution information to the first anti-virus unit in the first information processing unit and removes the virus in the first information processing unit.

3. The information processing apparatus according to claim 2, wherein the first information processing unit cancels, by itself, the communication suspension command at the communication unit in itself, based on a reconnection instruction returned as a response to a transmission of a completion notification to the virus management function device indicating the completion of the virus removal using the anti-virus solution information by the first anti-virus unit.

4. The information processing apparatus according to claim 1, wherein the anti-virus startup unit is configured by a second anti-virus unit which removes, by itself, the virus in the first information processing unit by using the received anti-virus solution information.

5. The information processing apparatus according to claim 4, wherein the second information processing unit cancels the communication suspension command at the communication unit in the first information processing unit, based on a reconnection instruction returned as a response to a transmission of a completion notification to the virus management function device indicating the completion of the virus removal using the anti-virus solution information by the second anti-virus unit.

6. The information processing apparatus according to claim 1, wherein the first information processing unit is a PC unit, and the second information processing unit is a mobile phone unit.

7. The information processing apparatus according to claim 1, wherein the communication network configured by the first communication system is an IP communication network, and the communication network configured by the second communication system is a circuit switching network.

8. The information processing apparatus according to claim 1, wherein the anti-virus solution information contains an anti-virus tool and a virus definition file.

9. A virus management function device comprising:
- a virus judgment unit which is connected with a communication unit of a first information processing unit in an information processing apparatus through a first communication system of a communication network and is configured to detect virus infection from information during communication by the first communication unit of the first information processing unit through the first communication system of the communication network;
- a communication suspension instruction unit which is connected with both a communication suspension instruction unit and an anti-virus startup unit of a second information processing unit coupled with the first information processing unit as one body in the information processing apparatus, through a second communication system of the communication network, the second communication system being different in type and independent from the first communication system, and is configured to transmit a communication suspension instruction for suspending the communication by the communication unit of the first information processing unit to the second information processing unit in the information processing apparatus through the second communication system of the communication network when detecting the virus infection; and
- an anti-virus solution information transmission unit which is connected to the second information processing unit through the second communication system and is configured to subsequently transmits anti-virus solution information, after transmitting the communication suspension instruction, for removing the virus in the information processing apparatus through the second communication system to the second information processing unit.

10. The virus management function device according to claim 9, further comprising a reconnection instruction unit which returns back a communication reconnection instruction for canceling the communication suspension instruction through the second communication system to the second information processing unit in response to the transmission of the completion notification through the second communication system from the second information processing unit, due to the completion of the removal of the virus in the first information processing unit by the anti-virus solution information.

11. The virus management function device according to claim 10, wherein virus management function device has integrally built-in virus judgment unit, the communication suspension instruction unit, the restoration solution information transmission unit, and the reconnection instruction unit.

12. The virus management function device according to claim 10, wherein the virus management function device is configured by a first virus management function unit provided with the virus judgment unit, the communication suspension instruction unit, and the reconnection instruction unit and a second virus management function unit independent from the first virus management function unit, and the second virus management function unit provides the anti-virus solution information to the second information processing unit through the first virus management function unit or directly upon receipt of notification of virus infection by the virus judgment unit.

13. The virus management function device according to claim 9, wherein the first communication system is an IP communication network, and the second communication system is a circuit switching network.

14. The virus management function device according to claim 9, wherein the anti-virus solution information contains an anti-virus tool and a virus definition file.

15. A virus removing method in an information processing apparatus having a first information processing unit and a second information processing unit, the virus removing method comprising:
- communicating information by the first information processing unit through a first communication system of a communication network via a virus management function device;
- stopping the communicating by the first information processing unit by a communication suspension instruction received by the second information processing unit which is coupled with the first information processing unit as one body in the information processing apparatus, through a different second communication system of a communication network independent from the first communication system, from the virus management function device, due to detection of virus infection from the information by the virus management function device during the communicating by the first information processing unit;
- subsequently receiving anti-virus solution information from the virus management function device through the second communication system;
- removing the virus in the first information processing unit based on the received anti-virus solution information; and
- restarting the communicating by the first information processing unit, when the virus removal is completed by the anti-virus solution information.

16. The virus removing method according to claim 15, wherein the removing of the virus is executed by the second information processing unit with respect to the first information processing unit based on the anti-virus solution information.

17. The virus removing method according to claim 15, wherein the removing of the virus is executed by the first information processing unit based on the anti-virus solution information transferred from the second information processing unit.

18. A virus removing method in a virus management function device, the virus removing method comprising:
- detecting virus infection from information during communication by a first information processing unit in an information processing apparatus through a first communication system of a communication network;
- transmitting a communication suspension instruction of suspending communication to a second information processing unit which is coupled with the first information processing unit as one body in the information processing apparatus, through a second communication system of the communication network, when detecting the virus infection, the second communication system being different in type and independent from the first communication system; and
- subsequently transmitting anti-virus solution information for removing the virus in the first information processing unit through the second communication system to the second information processing unit; after transmitting the communication suspension instruction.

19. A non-transitory computer readable medium having thereon recorded a program for allowing a computer to execute a method, in an information processing apparatus having a first information processing unit and a second information processing unit, the method comprising:

communicating information by the first information processing unit through a first communication system of a communication network through a virus management function device;

stopping the communicating by the first information processing unit by a communication suspension instruction received by the second information processing unit which is coupled with the first information processing unit as one body in the information processing apparatus, through a different second communication system of a communication network independent from the first communication system, from the virus management function device, due to detection of virus infection from the information by the virus management function device during the communicating by the first information processing unit;

subsequently receiving anti-virus solution information from the virus management function device through the second communication system;

removing the virus in the first information processing unit based on the received anti-virus solution information; and restarting the communicating by the first information processing unit, when the virus removal is completed by the anti-virus solution information.

20. A non-transitory computer readable medium having thereon recorded a program for allowing a computer to execute a method, in a virus management function device, the method comprising:

detecting virus infection from information during communication by a first information processing unit in an information processing apparatus through a first communication system of a communication network;

transmitting a communication suspension instruction for suspending communication to a second information processing unit which is coupled with the first information processing unit as one body in the information processing apparatus through a second communication system of the communication network, when detecting the virus infection, the second communication system being different in type and independent from the first communication system; and subsequently transmitting anti-virus solution information for removing the virus in the first information processing unit to the second information processing unit through the second communication system, after transmitting the communication suspension instruction.

* * * * *